(12) United States Patent
Kisaku

(10) Patent No.: US 9,487,240 B2
(45) Date of Patent: Nov. 8, 2016

(54) VEHICLE BODY STRUCTURE

(71) Applicant: HONDA MOTOR CO., LTD., Tokyo (JP)

(72) Inventor: Masanori Kisaku, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 58 days.

(21) Appl. No.: 14/421,519

(22) PCT Filed: Jul. 1, 2013

(86) PCT No.: PCT/JP2013/067992
§ 371 (c)(1),
(2) Date: Feb. 13, 2015

(87) PCT Pub. No.: WO2014/034253
PCT Pub. Date: Mar. 6, 2014

(65) Prior Publication Data
US 2015/0217809 A1 Aug. 6, 2015

(30) Foreign Application Priority Data

Aug. 31, 2012 (JP) ................................ 2012-191199
Aug. 31, 2012 (JP) ................................ 2012-191275

(51) Int. Cl.
*B62D 25/02* (2006.01)
*B62D 25/08* (2006.01)

(52) U.S. Cl.
CPC ............. *B62D 25/087* (2013.01); *B62D 25/02* (2013.01)

(58) Field of Classification Search
CPC .... B62D 25/02; B62D 27/023; B62D 65/02; B62D 25/087; B62D 25/04
USPC ............. 296/193.08, 203.03, 203.04, 187.11
See application file for complete search history.

(56) References Cited

FOREIGN PATENT DOCUMENTS

| JP | S55-25586 | 2/1980 |
|---|---|---|
| JP | S62-47479 | 3/1987 |
| JP | S64-1064 | 1/1989 |
| JP | 05-016837 | 1/1993 |
| JP | 2010-247612 | 11/2010 |
| JP | 2011-168121 | 9/2011 |
| WO | 2011/027638 | 3/2011 |

OTHER PUBLICATIONS

International Search Report, Date of mailing: Aug. 6, 2013.

*Primary Examiner* — Pinel Romain
(74) *Attorney, Agent, or Firm* — Rankin, Hill & Clark LLP

(57) ABSTRACT

A vehicle body structure is provided with: a floor for forming the floor surface of a vehicle body rear section; a rear panel raised from the rear end of the floor; left and right roof side rails extending in the front-rear direction on the upper left and right sides of the vehicle body; and left and right rear pillars extending downward toward the rear of the vehicle body from the left and right roof side rails. The lower end of the left rear pillar is joined to the outer left side section of an intersection section in the widthwise direction of the vehicle body, the intersection section being that at which the floor and the rear panel intersect.

20 Claims, 12 Drawing Sheets

FIG. 4
(a)
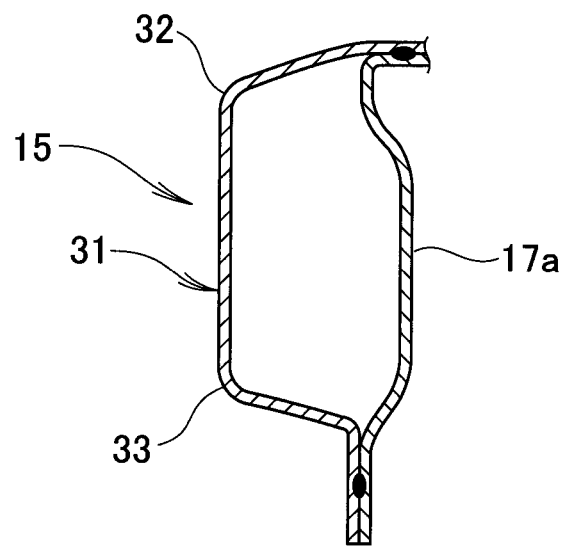
(b)
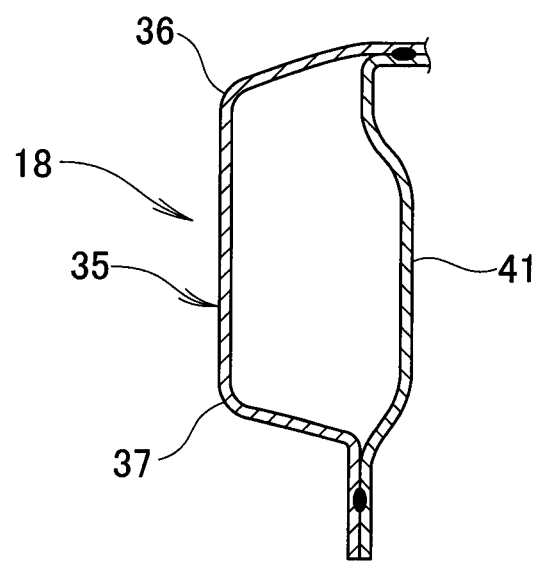

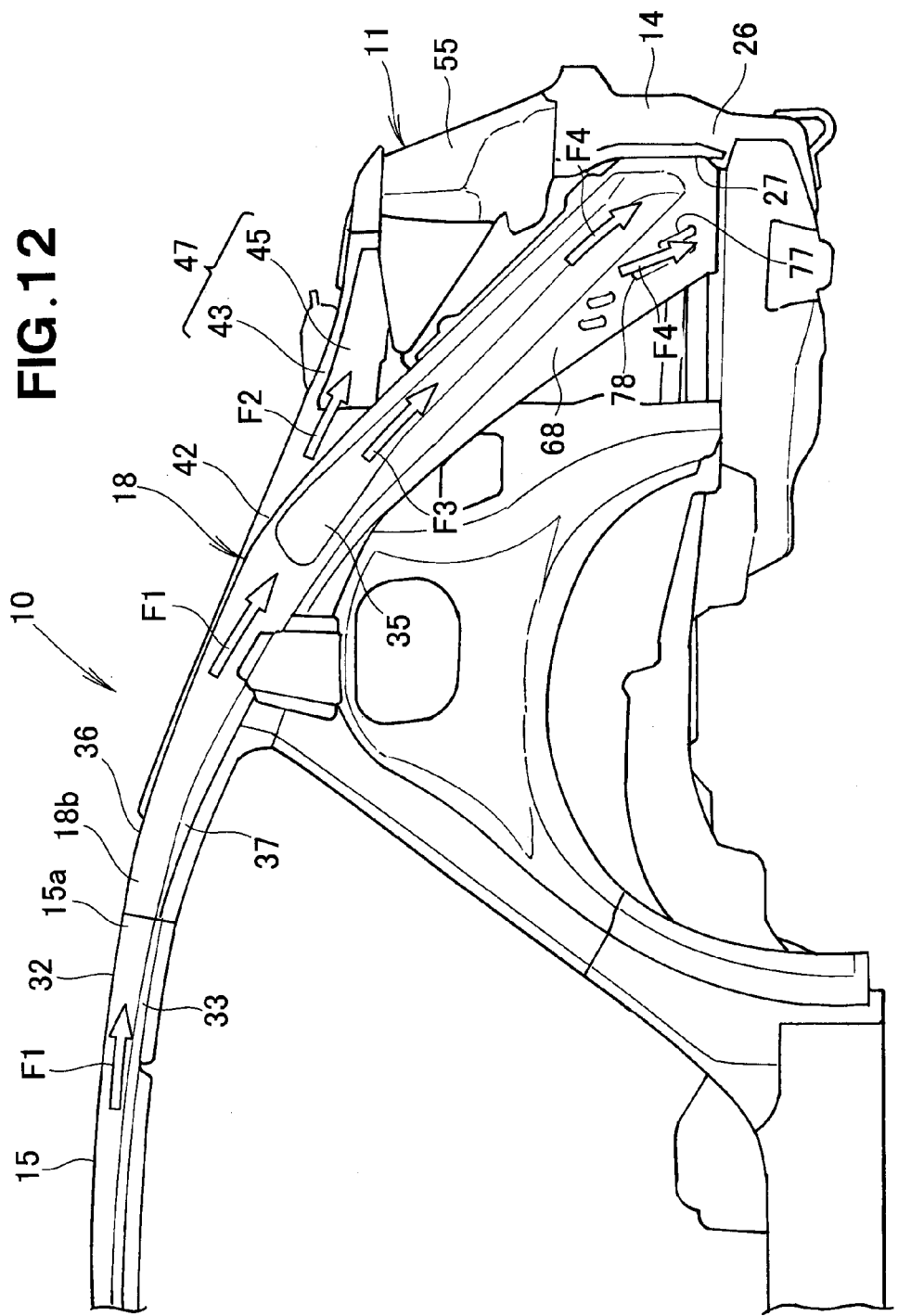

VEHICLE BODY STRUCTURE

TECHNICAL FIELD

The present invention relates to a vehicle body structure in which a rear panel is provided upward from the rear end of a floor of a vehicle body rear portion to form a rear wall of the vehicle body rear portion, and left and right rear pillars are provided at left and right roof side rails, respectively.

BACKGROUND ART

In a vehicle body structure, a rear pillar is extended from the rear end of a roof rail rearward and downward of the vehicle body, a rear end portion of the rear pillar is provided at an upper portion of a damper housing, and the upper portion of the damper housing is reinforced by a reinforcing member (see Patent Literature 1, for example). When a load is transmitted from the rear end of the roof rail to the rear pillar, for example, this vehicle body structure allows the transmitted load to be transmitted to the upper portion of the damper housing through the rear pillar. The transmitted load can be borne at the upper portion of the damper housing because the upper portion of the damper housing is reinforced by the reinforcing member.

On the other hand, in a vehicle body structure, a rear panel is generally raised upward from the rear end of a rear floor panel forming a floor portion of the vehicle body so that the raised rear panel forms a rear portion of a baggage compartment. The rear end of the rear floor panel and the rear panel are reinforced by a plurality of reinforcing members to ensure the rigidity and strength of the rear panel.

However, the vehicle body structure according to Patent Literature 1 requires that the upper portion of the damper housing be reinforced by the plurality of reinforcing members to bear a load transmitted from the rear pillar by the upper portion of the damper housing, resulting in a possible increase in the number of components. Further, it requires that the rear end of the rear floor panel and the rear panel be reinforced by the plurality of reinforcing members, resulting in a possible further increase in the number of components.

Moreover, in the vehicle body structure according to Patent Literature 1, the rear end portion of the rear pillar is provided at the upper portion of the damper housing. Thus, it can be considered that a relatively large load is input from the rear pillar to the upper portion of the damper housing. Therefore, it is necessary to reinforce the upper portion of the damper housing by the reinforcing members to bear a load input from the rear pillar.

PRIOR ART LITERATURE

Patent Literature

Patent Literature 1: JP 2010-247612 A

SUMMARY OF INVENTION

Technical Problem

It is an object of the present invention to provide a vehicle body structure that can bear a load transmitted to a rear pillar with a configuration of a reduced number of components, and can ensure the rigidity and strength of a rear panel.

It is another object of the present invention to provide a vehicle body structure that can disperse a load input to a rear pillar and transmit it to a vehicle body rear portion.

Solution to Problem

According to a first aspect of the present invention, there is provided a vehicle body structure that includes: a floor constituting a floor surface of a vehicle body rear portion; a rear panel rising upward from a rear end of the floor, thereby forming a rear wall of the vehicle body rear portion; a pair of roof side rails extending in a vehicle body front-back direction at upper left and right sides of the vehicle body; and a pair of rear pillars extending rearward and downward of the vehicle body from rear ends of the pair of roof side rails, wherein each of the rear pillars is joined at a lower end to an outer side portion of an intersection portion between the floor and the rear panel in a vehicle width direction.

Preferably, the rear pillars each include: a U-shaped cross-section portion having a side wall facing the outside in the vehicle width direction, an upper wall provided at an upper edge of the side wall, and a lower wall provided at a lower edge of the side wall, the U-shaped cross-section portion being formed by the side wall, the upper wall, and the lower wall; a flange portion extending vertically from the upper wall or the lower wall; and a flat plate portion formed by a vertical extension from the flange portion.

Preferably, the flat plate portion is formed to become gradually larger in an area from a longitudinally intermediate point of the rear pillar toward the lower end.

Preferably, the flat plate portion includes a bead headed toward the intersection portion between the floor and the rear panel.

Preferably, the U-shaped cross-section portion of the rear pillar becomes gradually smaller in cross-sectional width in the vehicle width direction toward the lower end.

Now, an outer side panel is provided at the outside of each rear pillar in the vehicle width direction, and an adhesive (for example, a mastic sealer) is applied between the rear pillar and the outer side panel. The application of the adhesive can reduce vibrations generated in the outer side panel and a dent caused by pressing the outer side panel from outside the vehicle by a hand. For this, it is necessary to provide a working space for the application of the adhesive between the rear pillar and the outer side panel. Thus, in the invention according to claim 5, the cross-sectional width of the rear pillar (that is, the U-shaped cross-section portion) is gradually reduced toward the lower end.

Preferably, the vehicle body structure further includes a rear parcel provided between the pair of rear pillars to separate a vehicle compartment and a baggage compartment, in which the rear pillars are each configured to have a closed cross section by a rear pillar stiffener and a rear pillar inner, and three members, the rear pillar stiffener, the rear pillar inner, and the rear parcel, are placed on each other and joined by spot welding.

The roof side rails and the rear pillars each preferably include a U-shaped cross-section portion having a ridge line, and the ridge lines of the roof side rails and the ridge lines of the rear pillars are formed continuously.

According to another aspect of the present invention, there is provided a vehicle body structure that includes: a floor constituting a floor surface of a vehicle body rear portion; a rear panel rising upward from a rear end of the floor, thereby forming a rear wall of the vehicle body rear portion; a pair of roof side rails extending in a vehicle body front-back direction at upper left and right sides of the vehicle body; and a pair of rear pillars extending rearward and downward of the vehicle body from rear ends of the pair of roof side rails, in which the rear pillars each include: a rear pillar stiffener provided outside in a vehicle width direction and joined at a lower end to the floor; a rear pillar inner joined to the inside of the rear pillar stiffener in the vehicle width direction to constitute a closed cross section with the rear pillar stiffener, the rear pillar inner having a bend bent from a longitudinally intermediate point toward the rear of the vehicle body and joined to the rear panel; and a rear pillar extension joined to the bend of the rear pillar inner from the outside in the vehicle width direction.

Preferably, the vehicle body structure further includes a rear parcel disposed between the pair of rear pillars to separate a vehicle compartment and a baggage compartment, in which three members, the rear pillar extension, the rear pillar inner, and the rear parcel, are placed on each other and joined.

The rear pillar extension is preferably joined to the bend of the rear pillar inner from the outside in the vehicle width direction to constitute a closed cross section with the bend.

The rear pillar extension preferably includes a leg portion joined to the rear pillar stiffener.

It is preferable that the rear pillar extension be configured such that the closed cross section formed by the rear pillar extension and the rear pillar inner becomes smaller toward the rear end.

Advantageous Effects of Invention

In one form of the invention, the intersection portion is provided between the floor and the rear panel, and the lower end of the rear pillar is joined to the outer side portion of the intersection portion in the vehicle width direction. The intersection portion has a recessed corner portion with high rigidity and strength. Thus, by joining the lower end of the rear pillar to the side portion of the intersection portion, a load transmitted to the rear pillar can be favorably borne using the intersection portion. By bearing a load transmitted to the rear pillar by the intersection portion, it becomes unnecessary to provide a reinforcing member individually to bear a load as in a conventional art, and the number of components can be reduced.

Further, by joining the lower end of the rear pillar to the intersection portion of the floor and the rear panel, the floor and the rear panel can be reinforced by the rear pillar. This allows the rear panel to be firmly supported by the rear pillar, and thus the rigidity and strength of the rear panel can be ensured. Since the rigidity and strength of the rear panel can be ensured using the rear pillar like this, it becomes unnecessary to provide a reinforcing member individually for ensuring the rigidity and strength of the rear panel as in the conventional art, and thus the number of components can be reduced.

That is, in the above form of the invention, by joining the lower end of the rear pillar to the intersection portion of the floor and the rear panel, a load transmitted to the rear pillar can be borne by a structure with a reduced number of components, and the rear panel can be firmly supported.

In another form, by forming the U-shaped cross-section portion with the side wall, the upper wall, and the lower wall of the rear pillar, the U-shaped cross-section portion can form a recessed storage space. Using the storage space, a vehicle-mounted unit such as a warning device (alarm) or a triaxial acceleration sensor, for example, can be disposed. This eliminates the need for ensuring a space for providing the vehicle-mounted unit outside the rear pillar, and thus a sufficiently large baggage compartment space can be ensured.

Further, the flange portion is extended vertically from the upper wall or the lower wall of the U-shaped cross-section portion to extend the flat plate portion vertically from the flange portion. Therefore, by joining the flat plate portion to the vehicle body rear portion (the rear panel and the floor), a load transmitted to the rear pillar can be favorably borne by the vehicle body rear portion (including the intersection portion), and the rigidity and strength of the vehicle body rear portion can be further increased.

In a further form, the flat plate portion is formed to become gradually larger in area from a longitudinally intermediate point of the rear pillar toward the lower end. Thus, a portion with a larger area of the flat plate portion can be joined to the vehicle body rear portion. Therefore, a load transmitted to the rear pillar can be dispersed by the flat plate portion to be transmitted to the vehicle body rear portion, so that the load transmitted from the rear pillar can be more favorably borne by the vehicle body rear portion.

In a still further form, the bead of the flat plate portion is provided to be headed toward the intersection portion between the floor and the rear panel. Thus, a load transmitted to the rear pillar can be transmitted to the intersection portion with high rigidity by the bead. Therefore, a load transmitted from the rear pillar can be more favorably borne by the vehicle body rear portion (particularly, the intersection portion).

In a still further form, the rear pillar (that is, the U-shaped cross-section portion) is gradually reduced in cross-sectional width toward the lower end. Thus, a relatively large working space can be ensured below the rear pillar. By using the working space, an adhesive can be applied between the rear pillar and the outer side panel.

In a still further form, the rear pillar is formed to have a closed cross section by the rear pillar stiffener and the rear pillar inner, and three members, the rear pillar stiffener, the rear pillar inner, and the rear parcel, are joined by spot welding. Therefore, a large plate thickness dimension can be ensured at a joint of the three members, and the joint strength of the rear pillar and the rear parcel can be increased. Thus the rigidity and strength of the vehicle body structure can be increased.

In a still further form, the roof side rails and the rear pillars include the U-shaped cross-section portions, and the ridge lines of the U-shaped cross-section portions are formed continuously. This allows a load to be transmitted favorably between the roof side rail and the rear pillar, and the load transmission efficiency can be increased.

In a still further form, the rear pillars are each configured to have a closed cross section with the rear pillar stiffener and the rear pillar inner, and the bend of the rear pillar inner is bent rearward of the vehicle body to be joined to the rear panel. Further, the rear pillar extension is joined to the bend to reinforce the bend with the rear pillar extension, whereby the rigidity and strength of the bend can be ensured. Thus, a portion of a load input to the rear pillar can be transmitted to the bend. Therefore, a load input to the rear pillar can be dispersed and transmitted to the vehicle body rear portion, and the dispersed load can be favorably borne by the vehicle body rear portion.

In a still further form, three members, the rear pillar extension, the rear pillar inner, and the rear parcel, are placed on each other and joined. Therefore, a large plate thickness dimension can be ensured at a joint of the three members, and the joint strength of the rear pillar extension, the rear pillar inner, and the rear parcel can be increased, and thus the rigidity and strength of the vehicle body structure can be increased.

In a still further form, by joining the rear pillar extension to the bend, the rear pillar extension and the bend constitute (form) a closed cross section. Therefore, the rigidity and strength of the rear pillar extension and the bend can be increased, and thus a load input to the rear pillar can be favorably transmitted, and the load transmission efficiency can be increased.

In a still further form, the leg portion is provided to the rear pillar extension, and the leg portion is joined to the rear pillar stiffener. Thus, the rear pillar extension can be supported by the rear pillar stiffener, so that the rigidity and strength of the rear pillar extension and the bend can be further increased. Therefore, a load input to the rear pillar can be more favorably transmitted, and the load transmission efficiency can be further increased.

In a still further form, the closed cross section formed by the rear pillar extension and the rear pillar inner is configured to be reduced toward the rear end. Thus, by reducing the closed cross section toward the rear end, a load transmission efficiency of favorably transmitting a load can be ensured, and a space for providing a vehicle body component can be ensured.

BRIEF DESCRIPTION OF DRAWINGS

FIG. 4(a) is a cross-sectional view taken along line 4a-4a of FIG. 2, and FIG. 4(b) is a cross-sectional view taken along line 4b-4b of FIG. 2.

FIG. 12 is a diagram illustrating an example in which the vehicle body structure according to the present invention bears a load input from a left roof side rail to a left rear pillar.

DESCRIPTION OF EMBODIMENTS

A best mode for carrying out the present invention will be described below with reference to the accompanying drawings. The words "front (Fr)," "rear (Rr)," "left (L)," and "right (R)" conform to directions viewed from a driver.

Embodiment

Figure 1:
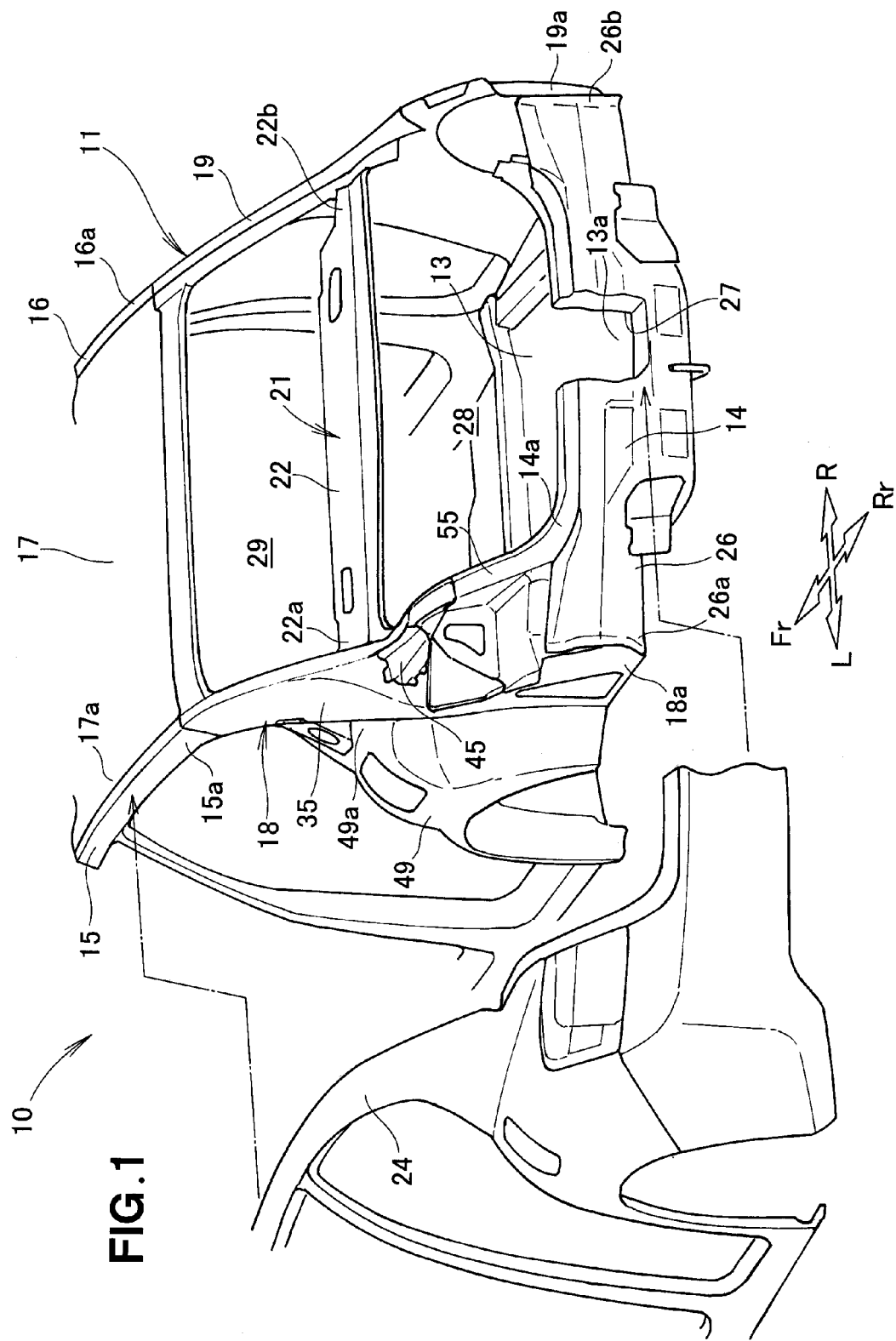
FIG. 1 is an exploded perspective view showing a vehicle body structure according to the present invention.

As shown in FIG. 1, a vehicle body structure 10 includes a floor 13 constituting a floor surface of a vehicle body rear portion 11, a rear panel 14 raised upward from a rear end 13a of the floor 13, left and right roof side rails (a pair of roof side rails) 15 and 16 extending in a vehicle body front-back direction at the upper left and right sides of the vehicle body structure 10, a left rear pillar 18 provided at a rear end 15a of the left roof side rail 15, and a right rear pillar 19 provided at a rear end 16a of the right roof side rail 16.

The vehicle body structure 10 further includes a rear parcel 21 disposed between the left and right rear pillars (the pair of rear pillars) 18 and 19, a left outer side panel 24 provided from the outside (left side) of the left rear pillar 18 and the left roof side rail 15 in a vehicle width direction, and a right outer side panel (not shown) provided from the outside (right side) of the right rear pillar 19 and the right roof side rail 16 in a vehicle width direction. The right outer side panel is a member symmetrical to the left outer side panel 24.

Figure 2:
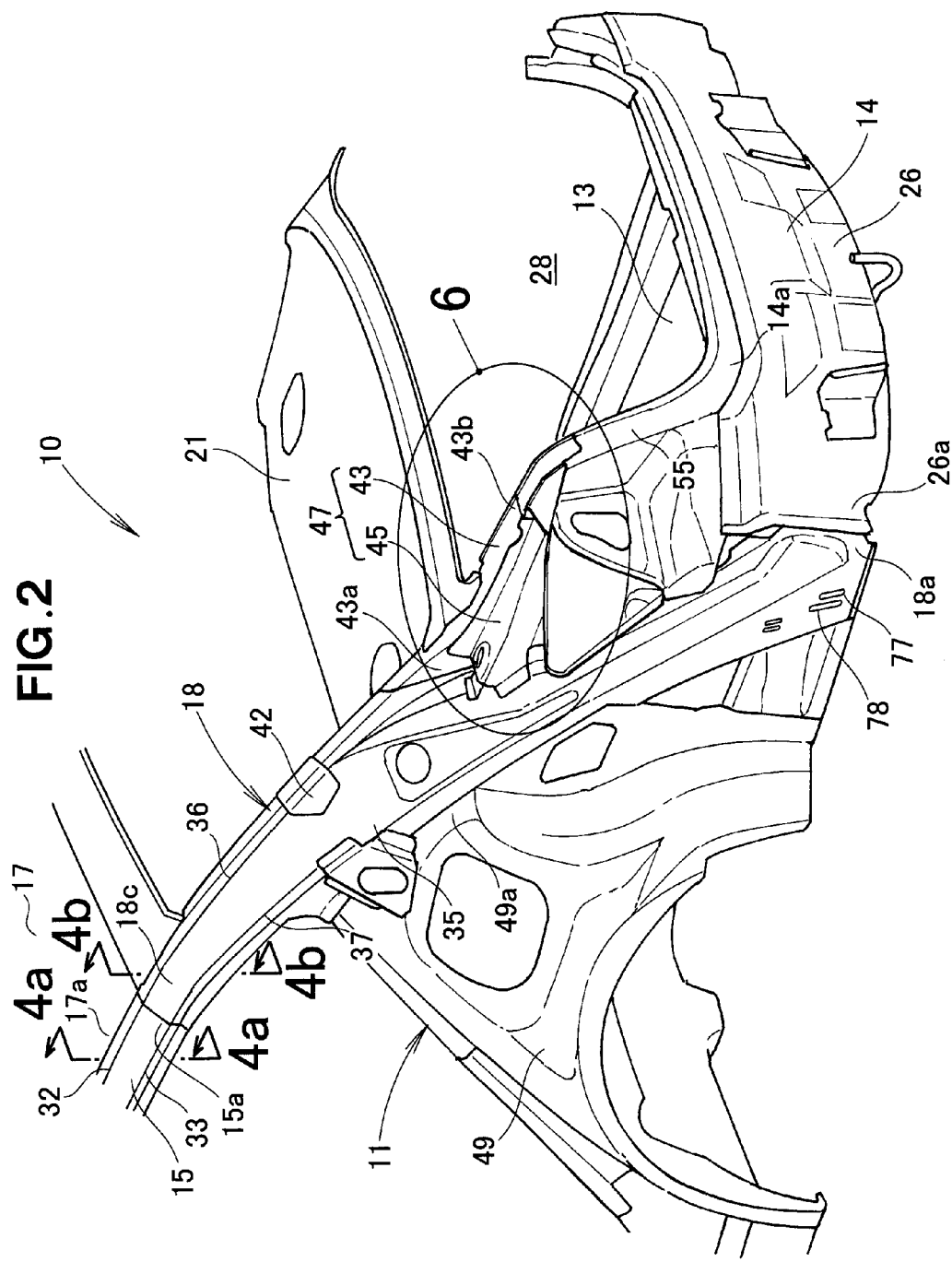
FIG. 2 is a perspective view showing a principal part of the vehicle body structure of FIG. 1.
Figure 3:
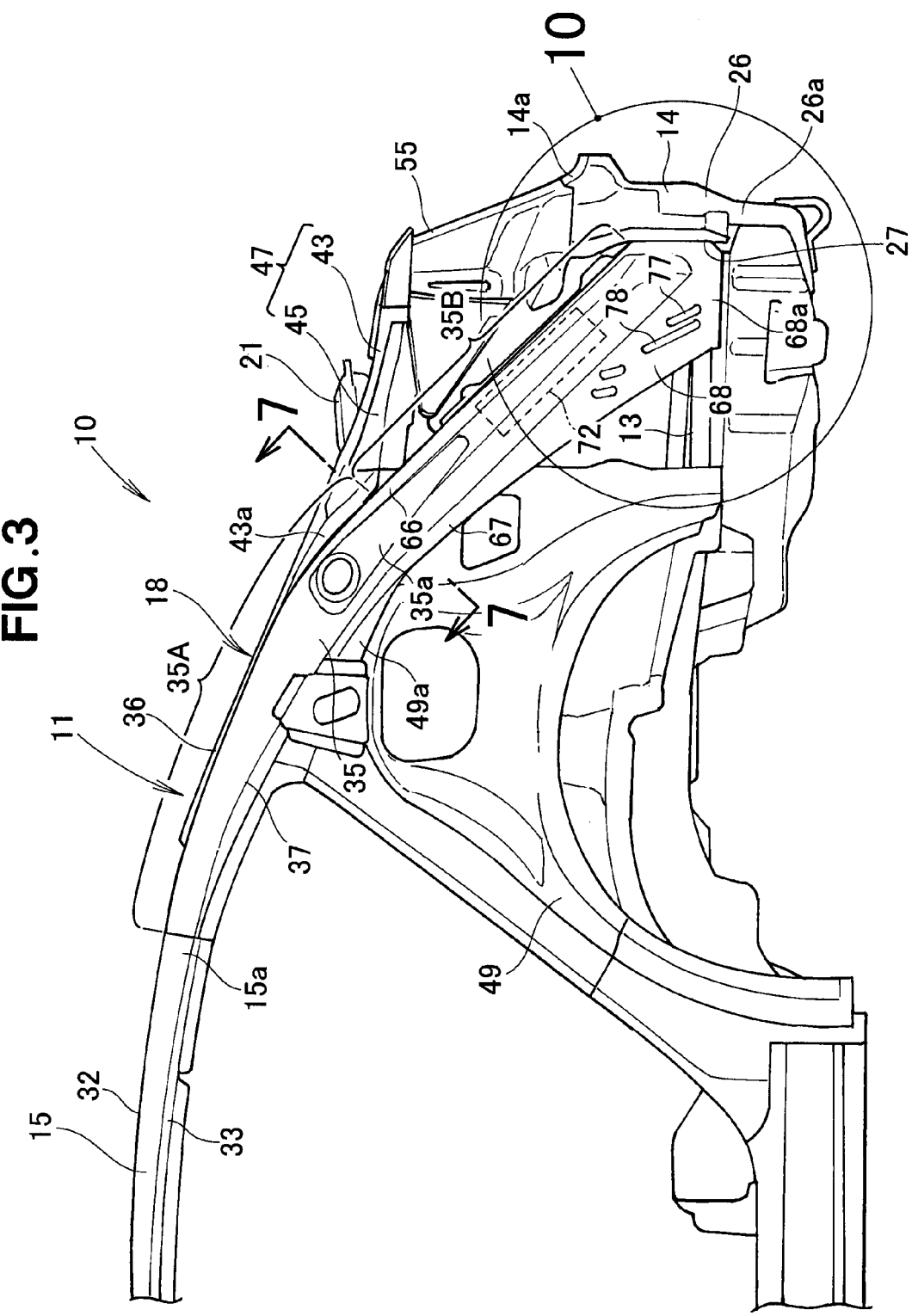
FIG. 3 is a side view showing the vehicle body structure of FIG. 2.

As shown in FIGS. 2 and 3, the rear panel 14 is a member raised upward from the rear end 13a of the floor 13 (see FIG. 1), thereby forming a rear wall of the vehicle body rear portion 11. By raising the rear panel 14 from the rear end 13a of the floor 13, the floor 13 and the rear panel 14 form a recessed intersection portion 26. The intersection portion 26 has a recessed corner portion 27 with high rigidity and strength. Further, by providing the rear panel 14 at the rear end 13a of the floor 13, the rear panel 14 separates a baggage compartment 28 from the outside.

As shown in FIGS. 2 and 4(a), the left roof side rail 15 is a rail-shaped member forming a left side frame portion of a roof 17 at the top of the vehicle body structure 10. The left roof side rail 15 includes a U-shaped cross-section portion 31 formed in a substantially U-shape in cross section. The U-shaped cross-section portion 31 has an upper ridge line (ridge line) 32 and a lower ridge line (ridge line) 33. Further, by joining a left side portion 17a of the roof 17 to the left roof side rail 15, the left roof side rail 15 and the left side portion 17a of the roof 17 form a closed cross section.

As shown in FIG. 1, the right roof side rail 16 is a rail-shaped member forming a right side frame portion of the roof 17 at the top of the vehicle body structure 10, like the left roof side rail 15. The right roof side rail 16 is a member symmetrical to the left roof side rail 15. Thus the right roof side rail 16 will not be described in detail.

As shown in FIGS. 2 and 4(b), the left rear pillar 18 is extended obliquely from the rear end 15a of the left roof side rail 15 rearward and downward of the vehicle body. Further, by extending the left rear pillar 18 obliquely, a lower end 18a of the left rear pillar 18 is joined to an outer left side portion (side portion) 26a of the intersection portion 26 in the vehicle width direction.

The left rear pillar 18 includes a pillar stiffener 35 formed in a substantially U-shape in cross section in a region 18c near the left roof side rail 15 (the rear end 15a), and has an upper ridge line (ridge line) 36 and a lower ridge line (ridge line) 37 on the pillar stiffener 35. The upper ridge line 36 of the pillar stiffener 35 is formed continuously with the upper ridge line 32 of the left roof side rail 15, and the lower ridge line 37 of the pillar stiffener 35 is formed continuously with the lower ridge line 33 of the left roof side rail 15. This allows a load to be transmitted favorably between the left roof side rail 15 and the left rear pillar 18, increasing the load transmission efficiency.

Figure 5:
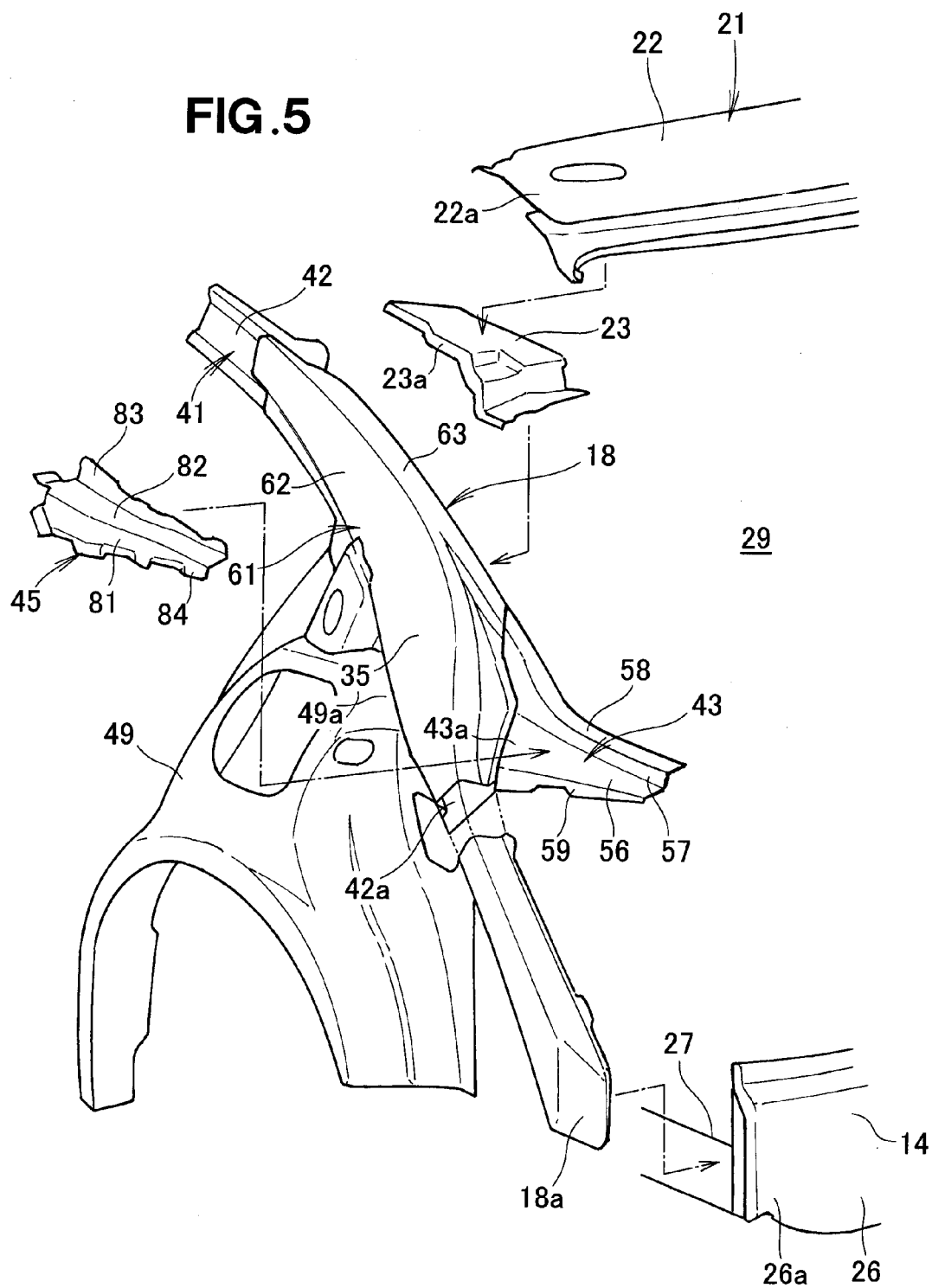
FIG. 5 is an exploded perspective showing the vehicle body structure of FIG. 2.
Figure 6:
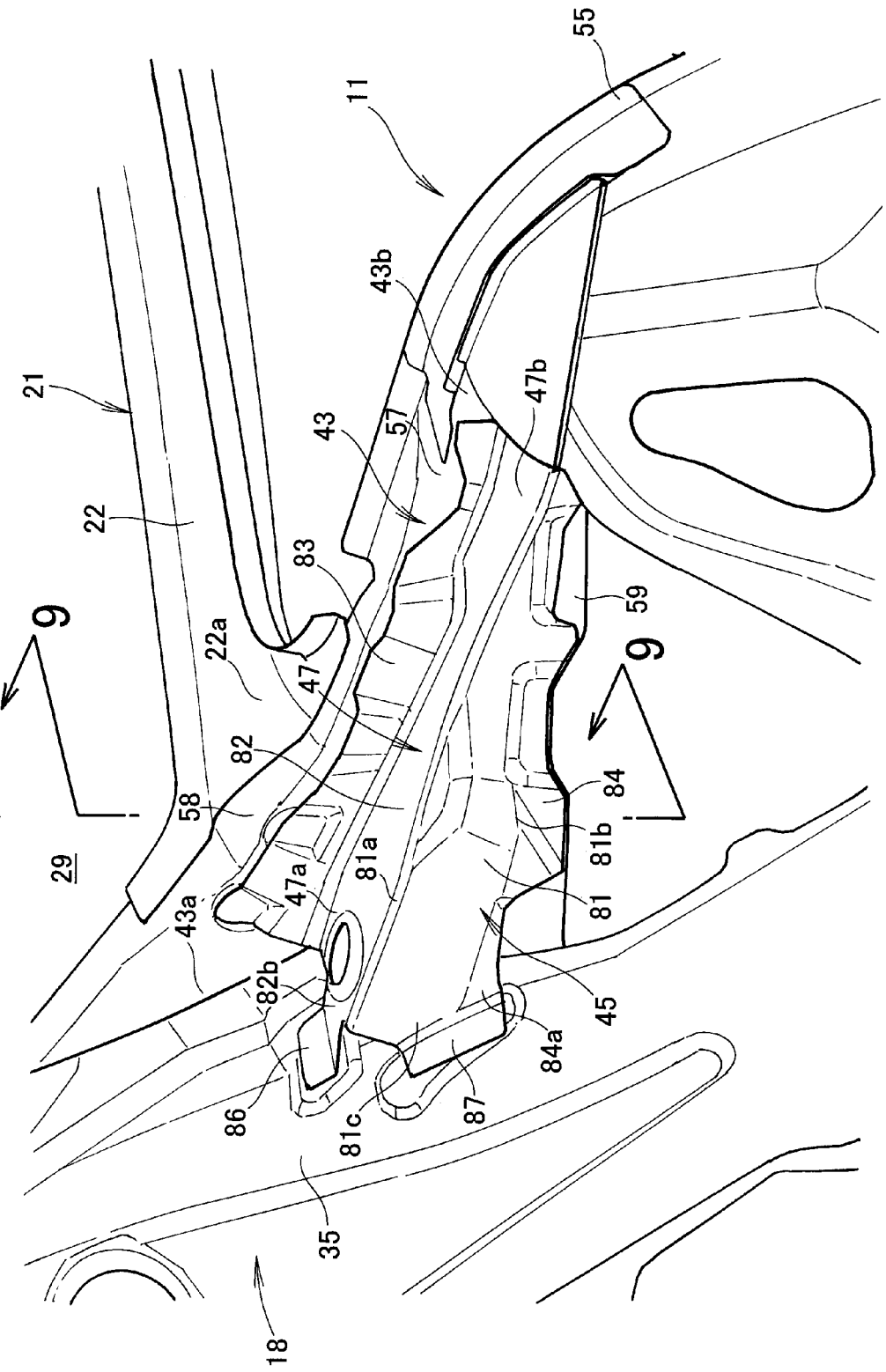
FIG. 6 is an enlarged view of a part 6 of FIG. 2.

As shown in FIGS. 5 and 6, the left rear pillar 18 includes the pillar stiffener (rear pillar stiffener) 35 provided outside in the vehicle width direction, a pillar inner (rear pillar inner) 41 joined to the inside of the pillar stiffener 35 (the inside of a vehicle compartment 29) in the vehicle width direction, and a pillar extension (rear pillar extension) 45 joined to an inner bend (bend) 43 of the pillar inner 41. A generally central portion of the left rear pillar 18 is joined to an upper portion 49a of a left rear wheel house 49.

The pillar inner 41 has an inner body 42 joined to the inside of the pillar stiffener 35 in the vehicle width direction, and the inner bend 43 bent substantially horizontally from a rear portion 42a of the inner body 42 toward the rear of the vehicle body. The inner body 42 is extended obliquely from the rear end 15a of the left roof side rail 15 (see FIG. 2) rearward and downward of the vehicle body to a proximal end 43a of the inner bend 43. The proximal end 43a of the inner bend 43 is provided at the rear portion 42a of the inner body 42.

Figure 7:
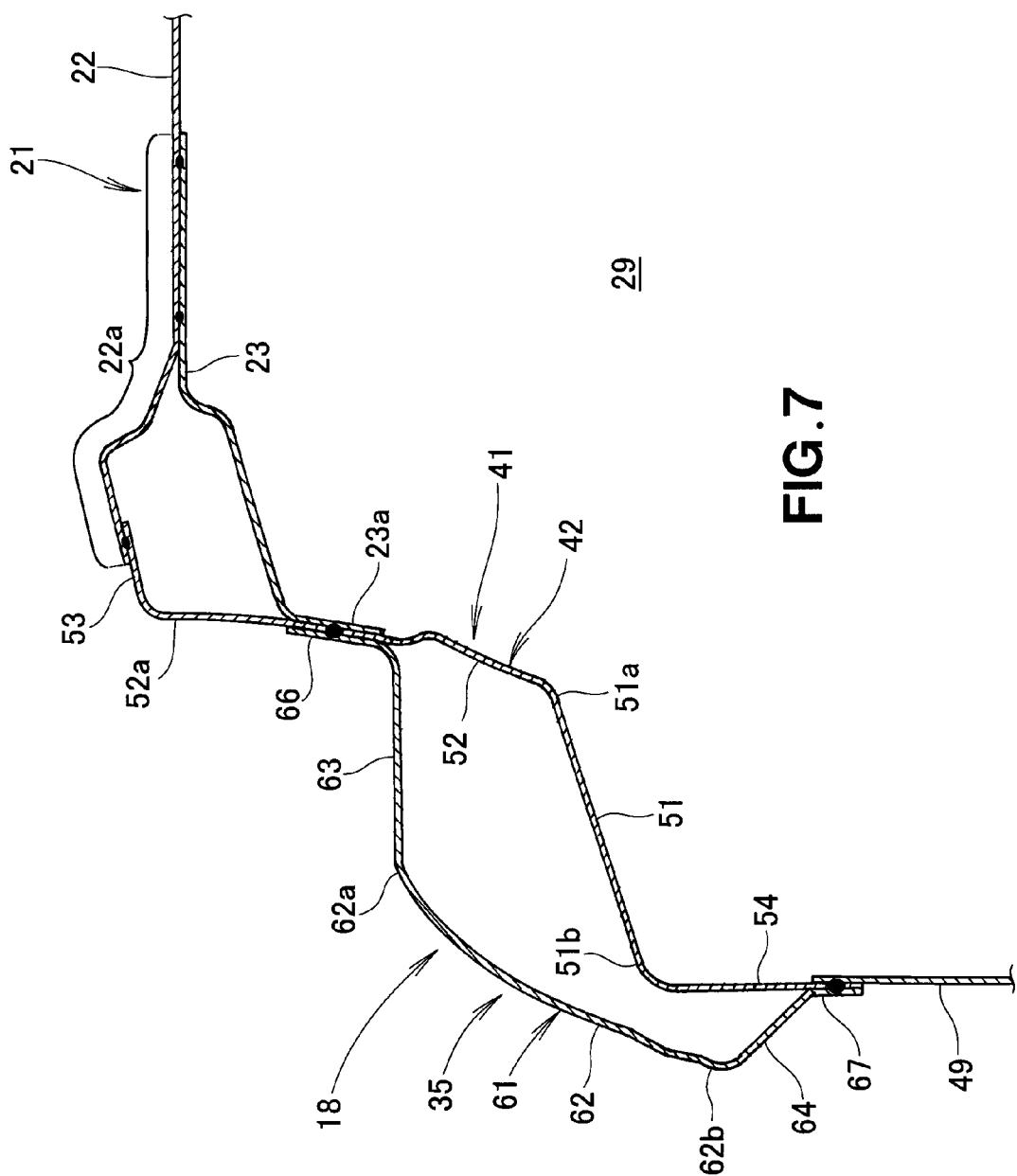
FIG. 7 is a cross-sectional view taken along line 7-7 of FIG. 3.

As shown in FIG. 7, by joining the inner body 42 to the pillar stiffener 35 from inside the vehicle compartment 29, the inner body 42 and the pillar stiffener 35 constitute a closed cross section. The inner body 42 has a bottom portion 51 provided in a gentle slope toward the inside in the vehicle width direction, an inclined wall 52 raised obliquely upward from an inner edge 51a of the bottom portion 51, an upper flange 53 bent inward in the vehicle width direction from an upper edge 52a of the inclined wall 52, and a lower flange 54 overhanging from an outer edge 51b of the bottom portion 51.

Figure 8:
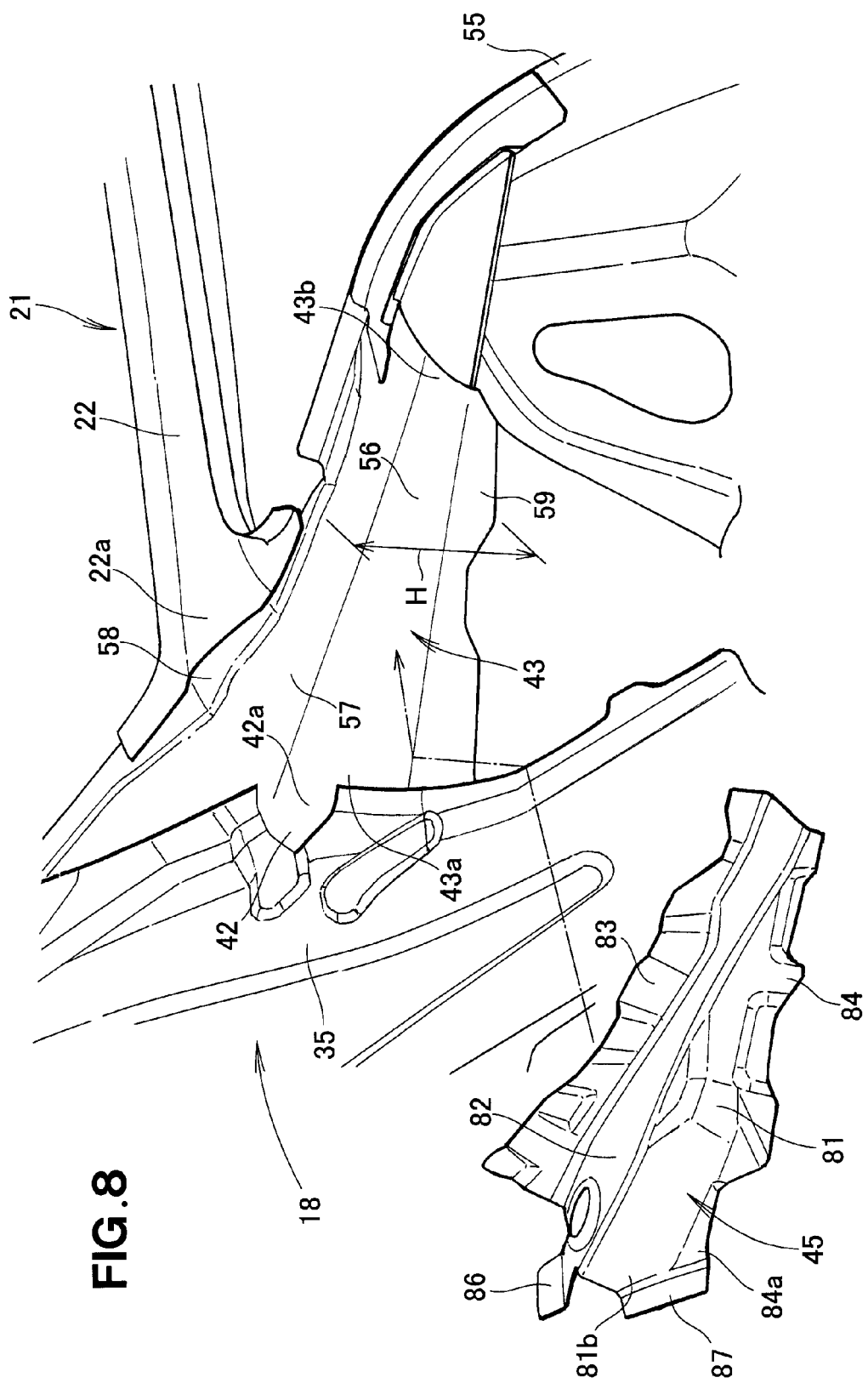
FIG. 8 is an exploded perspective view showing a state where a pillar extension is taken apart from the vehicle body structure of FIG. 6.

As shown in FIG. 8, the inner bend 43 is bent substantially horizontally from the rear portion 42a of the inner body 42 toward the rear of the vehicle body. The inner bend 43 is joined at a rear end 43b to an upper end 14a (see also FIG. 3) of the rear panel 14 on the outer side thereof in the vehicle width direction via a left rear garter 55. Further, the inner bend 43 is formed to be gradually smaller in height dimension H from the proximal end 43a to the rear end 43b.

Figure 9:
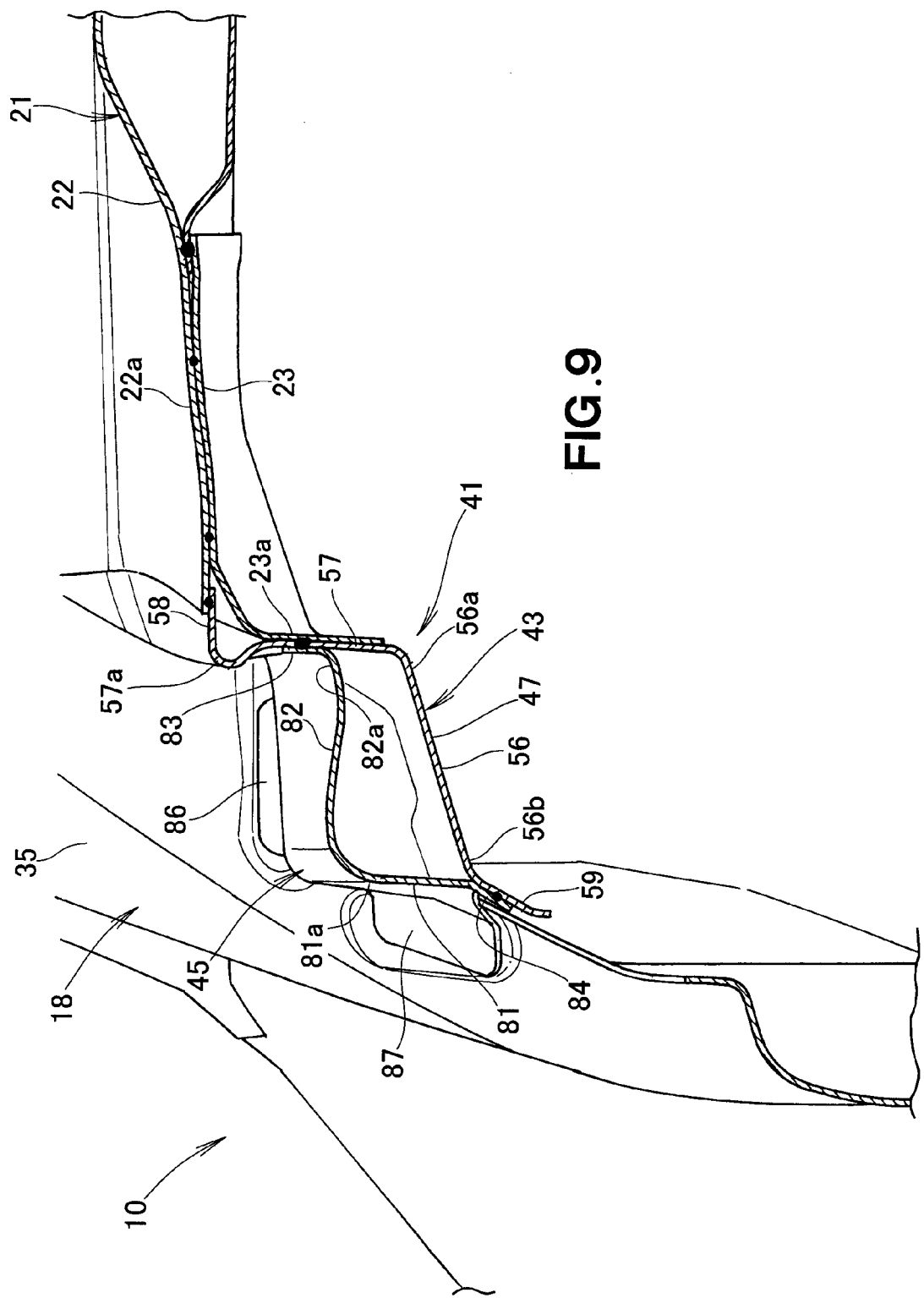
FIG. 9 is a cross-sectional view taken along line 9-9 of FIG. 6.

As shown in FIG. 9, the inner bend 43 has a bottom portion 56 provided in a gentle slope toward the inside in the vehicle width direction, a vertical wall 57 raised upward from an inner edge 56a of the bottom portion 56, an upper flange 58 bent inward in the vehicle width direction from an upper edge 57a of the vertical wall 57, and a lower flange 59 overhanging from an outer edge 56b of the bottom portion 56. The inner bend 43 is formed in a substantially crank shape in cross section by the bottom portion 56, the vertical wall 57, the upper flange 58, and the lower flange 59.

Figure 10:
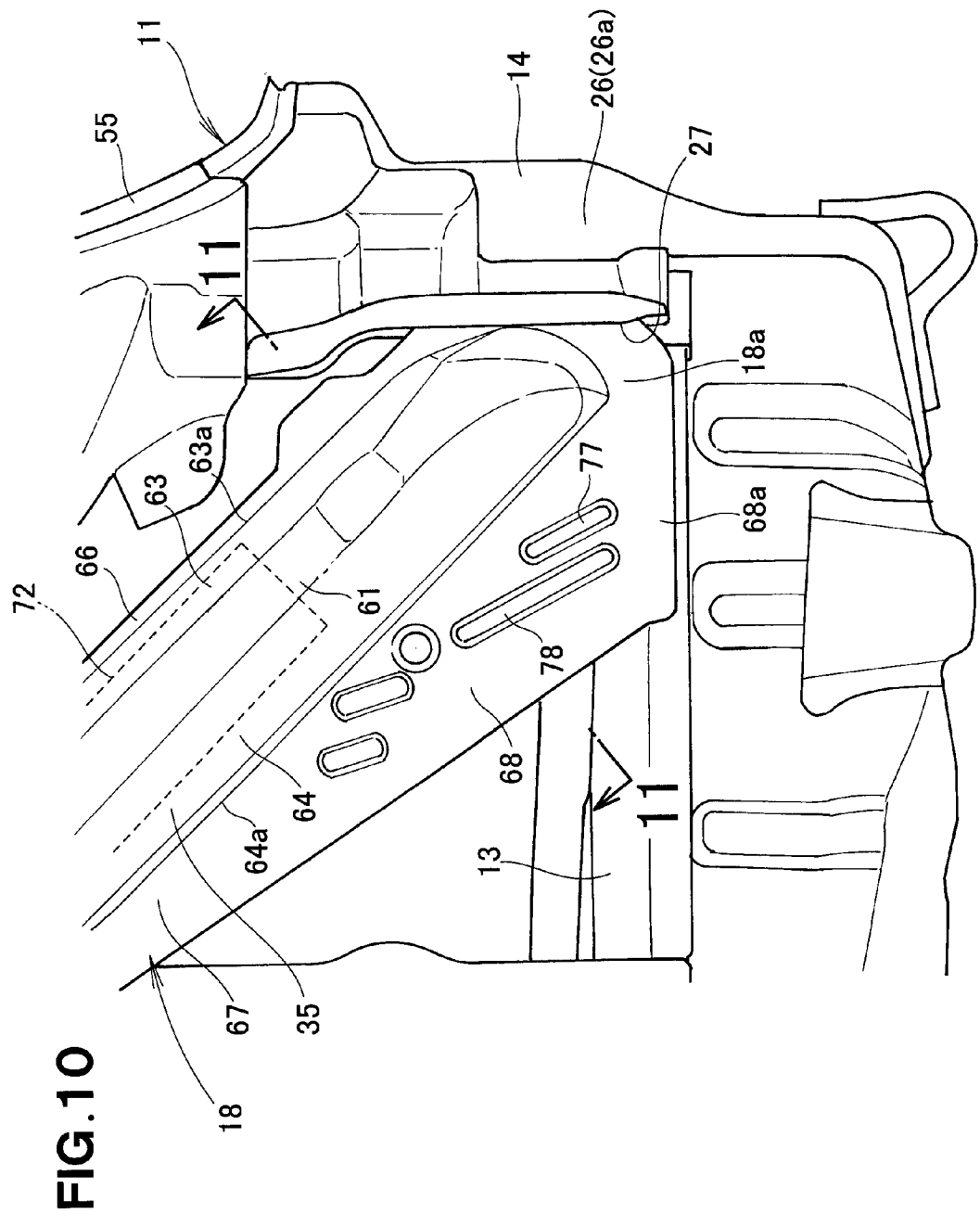
FIG. 10 is an enlarged view of a part 10 of FIG. 3.

A shown in FIGS. 2 and 10, the pillar stiffener 35 is joined to the inner body 42 (see FIG. 5) from the outside in the vehicle width direction, and is obliquely extended from the rear end 15a of the left roof side rail 15 rearward and downward of the vehicle body. By obliquely extending the pillar stiffener 35, a lower end of the pillar stiffener 35 (that is, the lower end 18a of the left rear pillar 18) is joined to the floor 13 and the rear panel 14. Specifically, the lower end 18a of the left rear pillar 18 is joined to the left side portion 26a of the intersection portion 26 formed by the floor 13 and the rear panel 14. The intersection portion 26 has the recessed corner portion 27 with high rigidity and strength.

Thus, by joining the lower end 18a of the left rear pillar 18 to the left side portion 26a of the intersection portion 26, a load transmitted to the left rear pillar 18 can be favorably borne using the intersection portion 26. This eliminates the need for providing a reinforcing member individually to bear a load transmitted to the left rear pillar 18, and can reduce the number of components.

Further, by joining the lower end 18a of the left rear pillar 18 to the intersection portion 26 of the floor 13 and the rear panel 14, the floor 13 and the rear panel 14 can be reinforced by the left rear pillar 18. This allows the rear panel 14 to be firmly supported by the left rear pillar 18, and thus the rigidity and strength of the rear panel 14 can be ensured. Since the rigidity and strength of the rear panel 14 can be ensured using the left rear pillar 18, it becomes unnecessary to provide a reinforcing member individually for ensuring the rigidity and strength of the rear panel 14, and thus the number of components can be reduced.

Thus, joining the lower end 18a of the left rear pillar 18 to the intersection portion 26 provides effects that a load transmitted to the left rear pillar 18 can be borne by a structure with a reduced number of components, and the rear panel 14 can be firmly supported.

As shown in FIGS. 3 and 7, the pillar stiffener 35 includes, in a first region 35A, a U-shaped cross-section portion 61, an upper flange portion (flange portion) 66 extending (overhanging) upward from the U-shaped cross-section portion 61, and a lower flange portion (flange portion) 67 extending (overhanging) downward from the U-shaped cross-section portion 61. The U-shaped cross-section portion 61 has a side wall 62 facing the outside in the vehicle width direction, an upper wall 63 provided at an upper end 62a of the side wall 62, and a lower wall 64 provided at a lower edge 62b of the side wall 62.

The pillar stiffener 35 in the first region 35A is joined to the inner body 42 from outside the vehicle body. Thus, the pillar stiffener 35 and the inner body 42 constitute a closed cross section. This can ensure the rigidity and strength of the left rear pillar 18 (the pillar stiffener 35 and the inner body 42) in the first region 35A.

Figure 11:
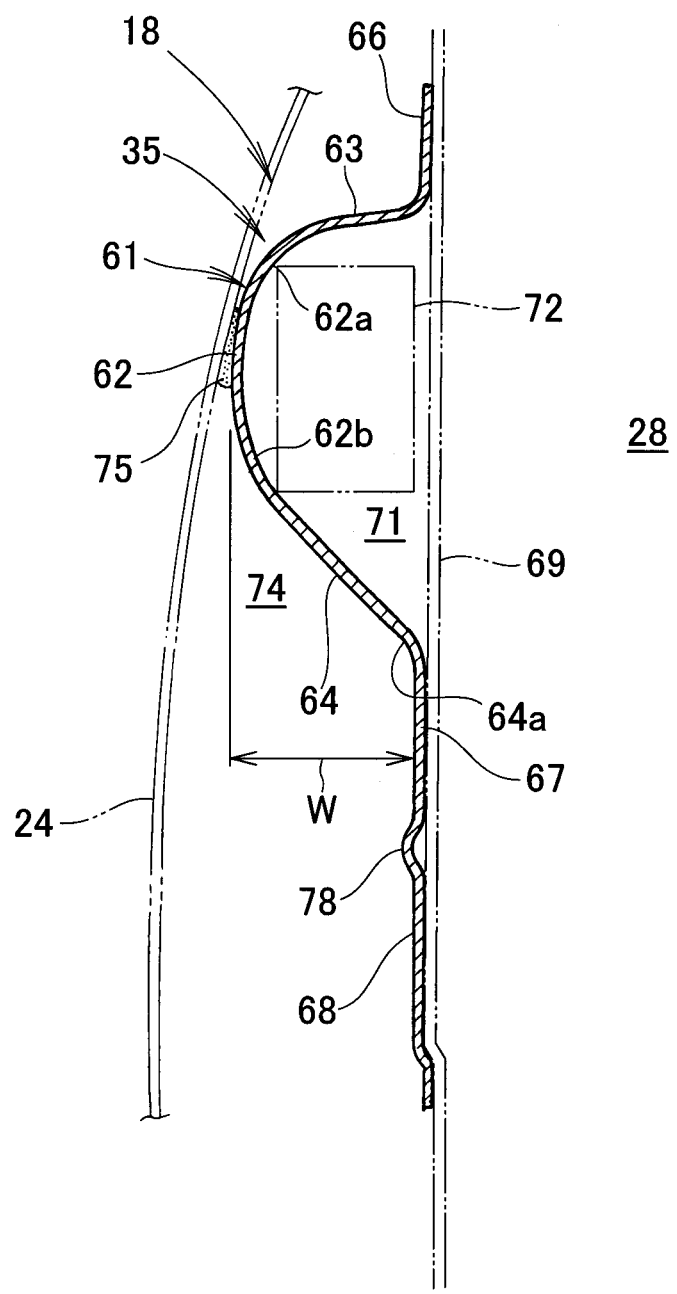
FIG. 11 is a cross-sectional view along line 11-11 of FIG. 10.

As shown in FIGS. 3 and 11, the pillar stiffener 35 includes, in a second region 35B, a U-shaped cross-section portion 61, an upper flange portion 66, and a lower flange portion 67, as in the first region 35A, and in addition to these portions 61, 66, and 67, includes a flat plate portion 68. The flat plate portion 68 is extended (overhangs) from the lower flange portion 67 downward in a flat-plate shape, thereby being formed vertically. Therefore, by joining the flat plate portion 68 to the vehicle body rear portion 11 (the rear panel 14 and the floor 13), a load transmitted to the left rear pillar 18 can be favorably borne by the vehicle body rear portion 11 (particularly, the intersection portion 26), and the rigidity and strength of the vehicle body rear portion 11 can be further increased.

In the second region 35B, the side wall 62 of the U-shaped cross-section portion 61 is formed in a substantially curved shape so as to face the outside in the vehicle width direction. The upper wall 63 is bent substantially horizontally from the upper end 62a of the side wall 62 toward the inside in the vehicle width direction. Further, the lower wall 64 is bent on a down grade from the lower edge 62b of the side wall 62 toward the inside in the vehicle width direction.

In the second region 35B, by forming the U-shaped cross-section portion 61 with the side wall 62, the upper wall 63, and the lower wall 64, the U-shaped cross-section portion 61 can form a recessed storage space 71. The storage space 71 is closed at the opening by a trunk lining 69 that separates the baggage compartment 28. Using the storage space 71, a vehicle-mounted unit 72 such as a warning device (alarm) or a triaxial acceleration sensor, for example, can be disposed. This eliminates the need for ensuring a space for providing the vehicle-mounted unit 72 outside the left rear pillar 18, and thus a sufficiently large baggage compartment space can be ensured.

Here, the U-shaped cross-section portion 61 has the lower wall 64 bent on the down grade from the lower edge 62b of the side wall 62 toward the inside in the vehicle width direction. By bending the lower wall 64 on the down grade, the U-shaped cross-section portion 61 is formed to be gradually smaller in cross-sectional width W in the vehicle width direction from the side wall 62 toward the lower edge (lower end) 64a of the lower wall 64.

Thus, a relatively large working space 74 can be ensured below the left rear pillar 18. By using the working space 74, an adhesive (for example, a mastic sealer) 75 can be applied between the left rear pillar 18 and the left outer side panel 24 (see also FIG. 1). This can reduce vibrations generated in the left outer side panel 24 and a dent caused by pressing the left outer side panel 24 from outside the vehicle by a hand.

A lower portion of the left rear pillar 18 and a lower portion of the left outer side panel 24 are joined by spot welding. The lower portion of the left outer side panel 24 is covered by an exterior member. Thus, a trace of welding can be concealed by the exterior member. By joining the lower portion of the left rear pillar 18 and the lower portion of the left outer side panel 24 by welding, sufficient rigidity and strength can be ensured.

As shown in FIGS. 10 and 11, the upper flange portion 66 is bent (overhangs) upward from the upper wall 63 (an inner edge 63a) of the U-shaped cross-section portion 61. The lower flange portion 67 is bent (overhangs) downward from the lower wall 64 (the inner edge 64a) of the U-shaped cross-section portion 61.

The flat plate portion 68 is formed to become gradually larger in area S (enlarged) from a longitudinally intermediate point 35a (see FIG. 3) of the pillar stiffener 35 (the lower flange portion 67) toward a lower end 68a. Thus, a portion with a larger area S of the flat plate portion 68 (that is, the lower end 68a) can be joined to the vehicle body rear portion 11. Therefore, a load transmitted to the left rear pillar 18 (the pillar stiffener 35) can be dispersed by the flat plate portion 68 to be transmitted to the vehicle body rear portion 11, so that the load transmitted from the left rear pillar 18 can be more favorably borne by the vehicle body rear portion 11 (particularly, the intersection portion 26).

Further, the flat plate portion 68 includes a first bead (bead) 77 and a second bead (bead) 78 headed toward the intersection portion 26 of the floor 13 and the rear panel 14. The first bead 77 and the second bead 78 are each formed in an oblique straight line generally along the U-shaped cross-section portion 61. By bulging the first bead 77 and the second bead 78 outward in the vehicle width direction, the rigidity of the first bead 77 and the second bead 78 can be ensured. Thus, a load transmitted to the left rear pillar 18 can be favorably transmitted to the intersection portion 26 with high rigidity by the first bead 77 and the second bead 78. Therefore, a load transmitted from the left rear pillar 18 can be more favorably borne by the vehicle body rear portion 11 (particularly, the intersection portion 26).

As shown in FIGS. 6 and 9, the pillar extension 45 is joined to the inner bend 43 of the pillar inner 41 from the outside in the vehicle width direction, and is joined to the pillar stiffener 35 from the outside in the vehicle width direction. By joining the pillar extension 45 to the inner bend 43 from the outside in the vehicle width direction, the inner bend 43 can be reinforced by the pillar extension 45 to ensure the rigidity and strength of the inner bend 43.

Thus, a portion of a load input to the left rear pillar 18 can be transmitted to the inner bend 43. The inner bend 43 is joined at the rear end 43b to the upper end 14a (see FIG. 3) of the rear panel 14 on the outer side thereof in the vehicle width direction via the left rear garter 55. Therefore, a load input to the left rear pillar 18 can be dispersed and transmitted to the upper end 14a of the rear panel 14 (that is, the vehicle body rear portion 11), and the dispersed load can be favorably borne by the vehicle body rear portion 11.

The pillar extension 45 has a vertical wall 81 raised substantially vertically, a top portion 82 bent inward in the vehicle width direction from an upper edge 81a of the vertical wall 81, an upper flange 83 bent upward from an inner edge 82a of the top portion 82, and a lower flange 84 overhanging from a lower edge 81b of the vertical wall 81. The pillar extension 45 is formed in a substantially crank shape in cross section by the vertical wall 81, the top portion 82, the upper flange 83, and the lower flange 84.

Further, the pillar extension 45 has a first leg portion (leg portion) 86 overhanging forward of the vehicle body from a front end 82b of the top portion 82, and a second leg portion (leg portion) 87 overhanging outward in the vehicle width direction from front portions 81c and 84a of the vertical wall 81 and the lower flange 84.

The upper flange 83 of the pillar extension 45 is joined to the vertical wall 57 of the inner bend 43, and the lower flange 84 of the pillar extension 45 is joined to the lower flange 59 of the inner bend 43, so that the pillar extension 45 and the inner bend 43 constitute a bend closed cross-section portion 47.

Thus, by the pillar extension 45 and the inner bend 43 constituting (forming) the bend closed cross-section portion 47, the rigidity and strength of the inner bend 43 can be increased. Therefore, a load input to the inner bend 43 can be favorably transmitted to the upper end 14a (see FIG. 3) of the rear panel 14, and thus the load transmission efficiency can be increased.

Further, the bend closed cross-section portion 47 is formed to have a substantially rectangular closed cross section, and is configured such that the shape of the closed cross section becomes smaller from a front end 47a to a rear end 47b. That is, the inner bend 43 is formed such that its cross-sectional shape becomes smaller toward the rear of the vehicle body. Further, the pillar extension 45 is formed such that its cross-sectional shape becomes smaller toward the rear of the vehicle body. Thus, the bend closed cross-section portion 47 is configured such that its closed cross-sectional shape becomes smaller from the front end 47a to the rear end 47b. This allows the bend closed cross-section portion 47 to ensure a load transmission efficiency of favorably transmitting a load, and allows the bend closed cross-section portion 47 to ensure a space for providing a vehicle body component.

In addition, the first leg portion 86 and the second leg portion 87 of the pillar extension 45 are joined to the pillar stiffener 35. Thus, the pillar extension 45 can be supported by the pillar stiffener 35, so that the rigidity and strength of the pillar extension 45 and the inner bend 43 (that is, the bend closed cross-section portion 47) can be further increased. Therefore, a load input to the left rear pillar 18 can be more favorably transmitted, and the load transmission efficiency can be further increased.

As shown in FIG. 1, the right rear pillar 19 is obliquely extended from the rear end 16a of the right roof side rail 16 rearward and downward of the vehicle body. By obliquely extending the right rear pillar 19, a lower end 19a of the right rear pillar 19 is joined to an outer right side portion 26b of the intersection portion 26 in the vehicle width direction. The right rear pillar 19 is a member symmetrical to the left rear pillar 18. Thus components thereof are denoted by the same reference numerals as those of the left rear pillar 18, and will not be described in detail.

As shown in FIGS. 1 and 7, the rear parcel 21 includes a rear parcel shelf 22 disposed between the left and right rear pillars 18 and 19 to separate the vehicle compartment 29 and the baggage compartment 28, a left parcel support 23 supporting a left end 22a of the rear parcel shelf 22, and a right parcel support (not shown) supporting a right end 22b of the rear parcel shelf 22. The left end 22a of the rear parcel shelf 22 is joined to the upper flange 53 of the left rear pillar 18 (the pillar inner 41), and the right end 22b of the rear parcel shelf 22 is joined to an upper flange (not shown) of the right rear pillar 19 (a pillar inner).

Further, the left end 22a of the rear parcel shelf 22 is supported on the left rear pillar 18 via the left parcel support 23. The left parcel support 23 is provided along the left end 22a of the rear parcel shelf 22, and has a left end 23a bent downward. The left end 23a of the left parcel support 23 is placed on the inclined wall 52 of the left rear pillar 18 (the inner body 42) from the inside in the vehicle width direction. The upper flange 66 of the left rear pillar 18 (the pillar stiffener 35) is also placed on the inclined wall 52 from the outside in the vehicle width direction.

That is, three members, the upper flange 66 of the pillar stiffener 35, the inclined wall 52 of the inner body 42, and the left end 23a of the left parcel support 23, are placed on each other and joined by spot welding. Thus, by joining the three members 66, 52, and 23a placed on each other, a large plate thickness dimension can be ensured at a joint of the three members 66, 52, and 23a, and the joint strength of the upper flange 66, the inclined wall 52, and the left end 23a can be increased. By increasing the joint strength of the three members 66, 52, and 23a, the rigidity and strength of the vehicle body structure 10 can be increased.

As shown in FIG. 9, the left end 23a of the left parcel support 23 is placed on the vertical wall 57 of the left rear pillar 18 (the inner bend 43) from the inside in the vehicle width direction. The upper flange 83 of the pillar extension 45 is also placed on the vertical wall 57 from the outside in the vehicle width direction.

That is, three members, the upper flange 83 of the pillar extension 45, the vertical wall 57 of the inner bend 43, and the left end 23a of the left parcel support 23, are placed on each other and joined by spot welding. Thus, by joining the three members 83, 57, and 23a placed on each other, a large plate thickness dimension can be ensured at a joint of the three members 83, 57, and 23a, and the joint strength of the upper flange 83, the vertical wall 57, and the left end 23a can be increased. By increasing the joint strength of the three members 83, 57, and 23a, the rigidity and strength of the vehicle body structure 10 can be further increased.

As shown in FIG. 1, a right end 22b of the rear parcel shelf 22 is supported on the right rear pillar 19 via a right parcel support. The right parcel support is a member symmetrical to the left parcel support 23, and will not be described in detail.

Next, an example of bearing a load input from the left roof side rail 15 to the left rear pillar 18 will be described with reference to FIG. 12. As shown in FIG. 12, a load F1 is input from the rear end 15a of the left roof side rail 15 through a front end 18b of the left rear pillar 18 to the left rear pillar 18 as shown by arrows. Here, the upper ridge line 36 of the pillar stiffener 35 is formed continuously with the upper ridge line 32 of the left roof side rail 15, and the lower ridge line 37 of the pillar stiffener 35 is formed continuously with the lower ridge line 33 of the left roof side rail 15.

Thus, the load F1 can be favorably transmitted between the left roof side rail 15 and the left rear pillar 18. A portion of the load F1 input to the left rear pillar 18 is dispersed as a load F2 to the bend closed cross-section portion 47. The load F2 dispersed to the bend closed cross-section portion 47 is transmitted through the left rear garter 55 to the rear panel 14. The transmitted load F2 is favorably borne by the rear panel 14 (the vehicle body rear portion 11).

On the other hand, the rest of the load F1 is transmitted as a load F3 to the pillar stiffener 35 and the inner body 42. The load F3 transmitted to the pillar stiffener 35 can be dispersed into loads F4 at the flat plate portion 68 to be transmitted to the vehicle body rear portion 11 (particularly, the intersection portion 26). The intersection portion 26 has the recessed corner portion 27 with high rigidity and strength. Thus, the dispersed loads F4 are favorably borne by the vehicle body rear portion 11 (particularly, the intersection portion 26). By favorably bearing the load F2 and the loads F4 by the vehicle body rear portion 11 like this, sufficient rigidity and strength of the vehicle body rear portion 11 can be ensured.

The vehicle body structure according to the present invention is not limited to the above-described embodiment, and alterations, modifications, and the like can be made as appropriate. For example, in this embodiment, an example of the flat plate portion 68 overhanging downward from the lower flange portion 67 has been described, which is not limiting. The flat plate portion 68 may be configured to overhang upward from the upper flange portion 66. Further, in this embodiment, an example of providing the first and second two leg portions 86 and 87 as leg portions at the pillar extension 45 has been described, but the number of the leg portions is not limited to this.

Further, in this embodiment, an example of providing the first and second beads 77 and 78 at the flat plate portion 68 has been described, which is not limiting. The number and the shape of beads can be changed as appropriate.

Further, the shapes and configurations of the vehicle body structure, the vehicle body rear portion, the floor, the rear panel, the left and right roof side rails, the roof, the left and right rear pillars, the rear parcel, the intersection portion, the pillar stiffener, the pillar inner, the inner bend, the pillar extension, the bend closed cross-section portion, the U-shaped cross-section portion, the flat plate portion, the first and second beads, the first and second leg portions, and others shown in this embodiment are not limited to those illustrated, and can be changed as appropriate.

INDUSTRIAL APPLICABILITY

The present invention is suitable for the application to an automobile with a vehicle body structure in which a rear panel is erected at the rear end of a floor of a vehicle body rear portion, and left and right rear pillars are provided at left and right roof side rails.

REFERENCE SIGNS LIST 10 vehicle body structure
11 vehicle body rear portion
13 floor
13a rear end of the floor
14 rear panel
15, 16 left and right roof side rails (a pair of roof side rails)
15a, 16a rear ends of the left and right roof side rails roof
18, 19 left and right rear pillars (a pair of rear pillars)
18a lower end of the left rear pillar
21 rear parcel
26 intersection portion
26a outer left side portion (side portion) in a vehicle width direction
28 baggage compartment
29 vehicle compartment
31 inverted-C-shaped cross-section portion of the left roof side rail
32, 33 upper and lower ridge lines (ridge lines) of the left roof side rail pillar stiffener (rear pillar stiffener)

35a longitudinally intermediate point of the pillar stiffener
36, 37 upper and lower ridge lines (ridge lines) of the pillar stiffener
41 pillar inner (rear pillar inner)
42 inner body
42b longitudinally intermediate point of the inner body
43 inner bend (bend)
45 pillar extension (rear pillar extension)
47 bend closed cross-section portion
61 U-shaped cross-section portion
62 side wall
63 upper wall
64 lower wall
64a lower edge (lower end) of the lower wall
66 upper flange portion (flange portion)
67 lower flange portion (flange portion)
68 flat plate portion
77 first bead (bead)
78 second bead (bead)
86, 87 first and second leg portions (leg portions)
W cross-sectional width

The invention claimed is:

1. A vehicle body structure comprising:
a floor constituting a floor surface of a vehicle body rear portion;
a rear panel rising upward from a rear end of the floor, thereby forming a rear wall of the vehicle body rear portion;
a pair of roof side rails extending in a vehicle body front-back direction at upper left and right sides of the vehicle body; and
a pair of rear pillars extending rearward and downward of the vehicle body from rear ends of the pair of roof side rails,
wherein each of the rear pillars is joined at a lower end to an outer side portion of an intersection portion between the floor and the rear panel in a vehicle width direction.

2. The vehicle body structure according to claim 1, wherein the rear pillars each comprise:
a U-shaped cross-section portion having a side wall facing the outside in the vehicle width direction, an upper wall provided at an upper edge of the side wall, and a lower wall provided at a lower edge of the side wall, the U-shaped cross-section portion being formed by the side wall, the upper wall, and the lower wall;
a flange portion extending vertically from the upper wall or the lower wall; and
a flat plate portion formed by a vertical extension from the flange portion.

3. The vehicle body structure according to claim 2, wherein the flat plate portion is formed to become gradually larger in area from a longitudinally intermediate point of the rear pillar toward the lower end.

4. The vehicle body structure according to claim 2, wherein the flat plate portion includes a bead headed toward the intersection portion between the floor and the rear pillar.

5. The vehicle body structure according to claim 2, wherein the U-shaped cross-section portion of each of the rear pillars becomes gradually smaller in cross-sectional width in the vehicle width direction toward the lower end.

6. The vehicle body structure according to claim 1, further comprising a rear parcel provided between the pair of rear pillars to separate a vehicle compartment and a baggage compartment, wherein
the rear pillars are each configured to have a closed cross section by a rear pillar stiffener and a rear pillar inner; and
three members, the rear pillar stiffener, the rear pillar inner, and the rear parcel, are placed on each other and joined by spot welding.

7. The vehicle body structure according to claim 1, wherein
the roof side rails and the rear pillars each include a U-shaped cross-section portion having a ridge line; and
the ridge lines of the roof side rails and the ridge lines of the rear pillars are formed continuously.

8. A vehicle body structure comprising:
a floor constituting a floor surface of a vehicle body rear portion;
a rear panel rising upward from a rear end of the floor, thereby forming a rear wall of the vehicle body rear portion;
a pair of roof side rails extending in a vehicle body front-back direction at upper left and right sides of the vehicle body; and
a pair of rear pillars extending rearward and downward of the vehicle body from rear ends of the pair of roof side rails,
wherein the rear pillars each comprise:
a rear pillar stiffener provided outside in a vehicle width direction and joined at a lower end to the floor;
a rear pillar inner joined to the inside of the rear pillar stiffener in the vehicle width direction to constitute a closed cross section with the rear pillar stiffener, the rear pillar inner having a bend bent from a longitudinally intermediate point toward the rear of the vehicle body and joined to the rear panel; and
a rear pillar extension joined to the bend of the rear pillar inner from the outside in the vehicle width direction.

9. The vehicle body structure according to claim 8, further comprising a rear parcel disposed between the pair of rear pillars to separate a vehicle compartment and a baggage compartment, wherein
three members, the rear pillar extension, the rear pillar inner, and the rear parcel, are placed on each other and joined.

10. The vehicle body structure according to claim 8, wherein the rear pillar extension is joined to the bend of the rear pillar inner from the outside in the vehicle width direction to constitute a closed cross section with the bend.

11. The vehicle body structure according to claim 8, wherein the rear pillar extension includes a leg portion joined to the rear pillar stiffener.

12. The vehicle body structure according to claim 10, wherein the rear pillar extension is configured such that the closed cross section formed by the rear pillar extension and the rear pillar inner becomes smaller toward the rear end.

13. The vehicle body structure according to claim 3, wherein the flat plate portion includes a bead headed toward the intersection portion between the floor and the rear pillar.

14. The vehicle body structure according to claim 3, wherein the U-shaped cross-section portion of each of the rear pillars becomes gradually smaller in cross-sectional width in the vehicle width direction toward the lower end.

15. The vehicle body structure according to claim 4, wherein the U-shaped cross-section portion of each of the rear pillars becomes gradually smaller in cross-sectional width in the vehicle width direction toward the lower end.

16. The vehicle body structure according to claim 2, further comprising a rear parcel provided between the pair of rear pillars to separate a vehicle compartment and a baggage compartment, wherein the rear pillars are each configured to have a closed cross section by a rear pillar stiffener and a rear pillar inner; and three members, the rear pillar stiffener, the rear pillar inner, and the rear parcel, are placed on each other and joined by spot welding.

17. The vehicle body structure according to claim 3, further comprising a rear parcel provided between the pair of rear pillars to separate a vehicle compartment and a baggage compartment, wherein the rear pillars are each configured to have a closed cross section by a rear pillar stiffener and a rear pillar inner; and three members, the rear pillar stiffener, the rear pillar inner, and the rear parcel, are placed on each other and joined by spot welding.

18. The vehicle body structure according to claim 4, further comprising a rear parcel provided between the pair of rear pillars to separate a vehicle compartment and a baggage compartment, wherein the rear pillars are each configured to have a closed cross section by a rear pillar stiffener and a rear pillar inner; and three members, the rear pillar stiffener, the rear pillar inner, and the rear parcel, are placed on each other and joined by spot welding.

19. The vehicle body structure according to claim 5, further comprising a rear parcel provided between the pair of rear pillars to separate a vehicle compartment and a baggage compartment, wherein the rear pillars are each configured to have a closed cross section by a rear pillar stiffener and a rear pillar inner; and three members, the rear pillar stiffener, the rear pillar inner, and the rear parcel, are placed on each other and joined by spot welding.

20. The vehicle body structure according to claim 2, wherein the roof side rails and the rear pillars each include a U-shaped cross-section portion having a ridge line; and the ridge lines of the roof side rails and the ridge lines of the rear pillars are formed continuously.

* * * * *